(12) United States Patent
Erkkilä

(10) Patent No.: US 8,783,443 B2
(45) Date of Patent: Jul. 22, 2014

(54) MATERIAL PROCESSING PLANT

(75) Inventor: Toni Erkkilä, Hämeenkyrö (FI)

(73) Assignee: Metso Minerals, Inc., Helsinki (FI)

( * ) Notice: Subject to any disclaimer, the term of this patent is extended or adjusted under 35 U.S.C. 154(b) by 0 days.

(21) Appl. No.: 13/342,296

(22) Filed: Jan. 3, 2012

(65) Prior Publication Data
US 2013/0168208 A1 Jul. 4, 2013

(51) Int. Cl.
B65G 41/02 (2006.01)
B07B 1/00 (2006.01)
B65G 41/00 (2006.01)

(52) U.S. Cl.
CPC .............. B65G 41/007 (2013.01); B07B 1/005 (2013.01); B65G 41/002 (2013.01)
USPC .......................... 198/506; 198/510.7; 198/517

(58) Field of Classification Search
CPC ............................ B65G 41/007; B65G 41/003
USPC ............... 198/313, 618, 510.1, 506, 512, 517
See application file for complete search history.

(56) References Cited

U.S. PATENT DOCUMENTS

| 4,981,204 | A | * | 1/1991 | Smith | 198/313 |
| 5,979,666 | A | | 11/1999 | Douglas | |
| 7,264,104 | B2 | * | 9/2007 | Heeszel et al. | 198/317 |
| 7,568,858 | B2 | * | 8/2009 | Viitasalo et al. | 404/110 |
| 8,182,172 | B2 | * | 5/2012 | Viitasalo et al. | 404/110 |
| 2009/0263194 | A1 | * | 10/2009 | Viitasalo et al. | 404/110 |
| 2010/0252395 | A1 | * | 10/2010 | Lehtonen et al. | 198/300 |
| 2013/0037453 | A1 | * | 2/2013 | Schirm et al. | 209/247 |

FOREIGN PATENT DOCUMENTS

| EP | 0 093 576 A2 | 11/1983 | |
| EP | 0 435 359 A1 | 7/1991 | |
| EP | 0435359 | * 7/1991 | ............... B07B 1/14 |
| EP | 1364714 | * 3/2003 | ............. B02C 21/02 |
| EP | 1 364 714 A1 | 11/2003 | |
| EP | 1 745 860 A1 | 1/2004 | |
| WO | 96/31295 A1 | 10/1996 | |
| WO | 98/44206 A1 | 10/1998 | |

OTHER PUBLICATIONS

PCT International Search Report dated Apr. 19, 2013.

* cited by examiner

Primary Examiner — Ramya Burgess
Assistant Examiner — Thomas Randazzo
(74) Attorney, Agent, or Firm — Andrus Intellectual Property Law, LLP

(57) ABSTRACT

A material processing plant comprising a frame and a body of a material processing apparatus connected to the frame and a feeder, and first joining means having a first support arm having a first pivot point and a second pivot point at a first distance from each other. The first pivot point is connected to a first end of the feeder and the second pivot point is connected to the frame of the processing plant for moving the first end of the feeder. The processing plant includes second joining means having a second support arm having a third pivot point and a fourth pivot point a second distance from each other. The third pivot point is connected to a second end of the feeder. The fourth pivot point is connected to the body of the processing apparatus. An actuator moves the feeder between a first position and a second position.

10 Claims, 6 Drawing Sheets

MATERIAL PROCESSING PLANT

FIELD OF THE INVENTION

The invention relates to a material processing plant. Particularly, though not exclusively, the invention relates to connecting a feeder movable to a body of a processing plant.

BACKGROUND OF THE INVENTION

Mineral material such as rock is gained from the earth for processing by exploding or excavating. Rock can also be natural and gravel or construction waste. The processing is typically crushing and/or screening of material. Mobile processing plants and stationary applications are used in the processing. An excavator or wheeled loader loads the material to be processed into a feed hopper of the processing plant from where a feeder feeds the material to be processed in a jaw of a crusher or a screen deck. The material to be processed can also be recyclable material such as concrete, plastic, wood, metal, bricks or asphalt.

Movable material processing plants are track or wheel based and may comprise means for material feeding such as a feed hopper, a feeder, a crusher, a screen and one or more conveyors for conveying processed material for storing or further processing.

A movable processing plant is transported to a working area generally by road on a truck carriage (a track based plant) or truck driven (a wheel based plant). Maximum transport dimensions (length, width, height) are defined in many countries and the transport is requiring special arrangements or is otherwise getting remarkable more difficult when these dimensions are exceeded.

In order to transport the mobile processing plant on road the length, width and height of it are to be put inside prescribed maximum dimensions. Side conveyors beside the processing plant are typically folded along the direction of the body of the processing plant and a joint may be arranged in an output conveyor in the end of the processing plant that the conveyor can be folded in a transport state.

Generally the feeder of the processing plant in its working position is forming the highest point of the processing plant which is why the feeder has to be lowered downwards particularly with movable screening plants in order to get a satisfactory transport height. Folding of wings of the feed hopper inside or outside the feed hopper has been a utilized solution. Putting the side wings in working and transport conditions can often be laborious and time consuming because in some cases they have to be locked in place entirely or partly man powered.

Because at least part of the feeder in the working position is locating above the processing plant the feeder has also to be moved horizontally in relation to the processing plant.

The publication EP1745860 shows a prior art mineral material processing plant comprising a body 112, a track base 121, a processing apparatus 123, a body 120 of the processing apparatus and a feeder 113 having wings which are foldable between transport and working positions.

In the known solution a lower end of the feeder 113 is moving via rails 127 and a sliding surface 110 which is fixed in the body 112. An upper end of the feeder is connected to the body 120 of the processing apparatus 123 via a rail 117 and a joining point 119. The feeder 113 is moving on the rails 117 and 127 which are gently inclined in relation to the horizontal plane so that when lowering the feeder to a transport position the total height is decreasing but due to the gentle angle the total length of the plant is increasing vis-a-vis more. As a result a folding mechanism may be required to be arranged in connection with an output conveyor in the opposite end of the processing plant in order to reach a sufficient short transport length.

An object of the invention is to provide a mineral material processing plant and a fixing structure of the feeder by which problems associated with the prior art may be avoided or at least minimized.

SUMMARY

According to a first aspect of the invention there is provided a material processing plant comprising a frame and a body of a material processing apparatus connected to the frame and a feeder for feeding material for the processing apparatus, and first joining means which comprise a first pivoted support arm to which are arranged a first pivot point and a second pivot point at a first distance from each other, which first pivot point is connected to a first end of the feeder and which second pivot point is connected to the frame of the processing plant for moving the first end of the feeder, wherein the processing plant further comprises second joining means which comprise a second pivoted support arm to which are arranged a third pivot point and a fourth pivot point at a second distance from each other, which third pivot point is connected to a second end of the feeder and which fourth pivot point is connected to the body of the processing apparatus for moving the second end of the feeder, and an actuator for moving the feeder between a first position and a second position.

Preferably the first distance between the first and second pivot points is larger than the second distance between the third and fourth pivot points.

Preferably the joining means are arranged to be moved in relation to the feeder and the processing apparatus between the first and the second positions, in which first position the fourth and the third pivot points are located in relation to each other substantially relative in direction of the horizontal plane and in the second position the fourth and the third pivot points are located in relation to each other substantially relative in direction of the vertical plane.

Preferably the second joining means are arranged to move in relation to the feeder and the processing apparatus between the first and the second positions, in which first position the third pivot point is located below the fourth pivot point viewed in relation to the horizontal plane and in the second position the third pivot point is located above the fourth pivot point viewed in relation to the horizontal plane.

Preferably the actuator is pivoted to the body of the processing apparatus and an end of the second support arm at the feeder side for moving the second support arm between the said first and second positions.

Preferably the actuator is pivoted to the feeder and an end of the first support arm at the processing apparatus side for moving the first support arm between the said first and second positions.

Preferably the said first position is the transport position of the processing plant and the second position is the working position of the processing plant.

Preferably the actuator is one of the following: an electric cylinder, a hydraulic cylinder, a pneumatic cylinder.

Preferably the processing plant further comprises locking means for locking the first or the second pivoted support arm substantially stationary in the said first and second positions.

Preferably the processing plant comprises third joining means which comprise a third pivoted support arm to which are arranged a fifth pivot point which is connected to the body of the processing apparatus and a sixth pivot point which is connected to the body of the processing plant for moving a second end of the processing apparatus.

Preferably the third joining means are arranged to be moved in relation to the frame of the processing plant and the body of the processing apparatus between fourth and fifth positions, in which fourth position the vertical distance of the frame and the body is smaller than in the fifth position.

The moving arrangement according to the invention is providing following advantages:
- The support structure is simpler and lighter than before because separate rail and slide mechanisms are not required.
- The joint mechanism is reliable in different weather conditions (water, snow, ice, frost) and in its operating environment (stone dust, stones or other loose material dropped from the process).
- Provides a cheaper and faster access for service or adjustment actions of the feeder and/or processing apparatus.
- Enables a stationary feeder hopper wing structure and leaving away a working phase caused by folding and locking the wings.

Different embodiments of the present invention will be illustrated or have been illustrated only in combination with one or some aspects of the invention. A person skilled in the art understands, that any embodiment of one aspect of the invention may be applied in the same aspect of the invention and in other aspects alone or as a combination with other embodiments.

BRIEF DESCRIPTION OF THE DRAWINGS

The invention will be described, by way of example, with reference to the accompanying drawings, in which.

DETAILED DESCRIPTION

Figure 1:
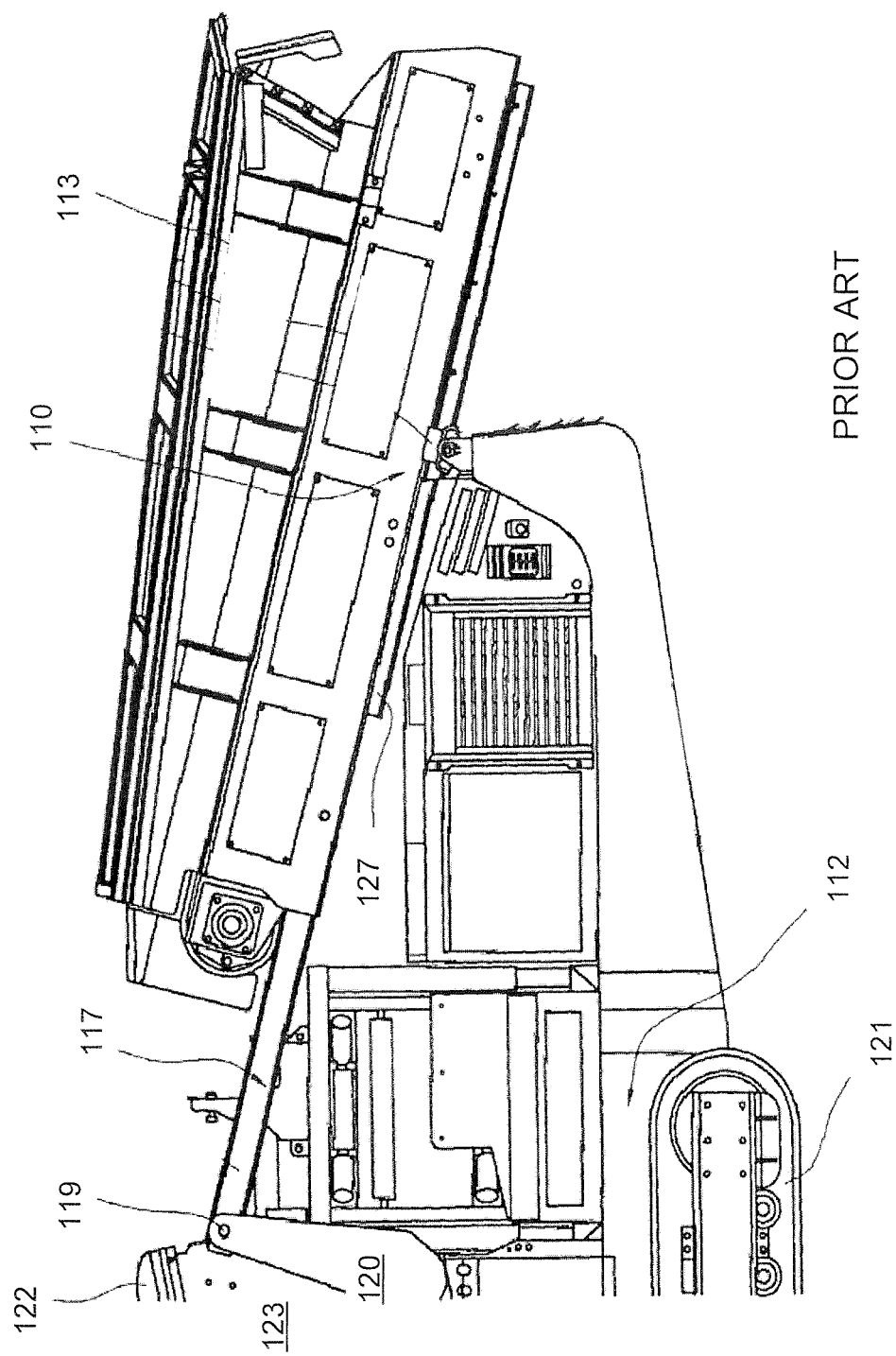
FIG. 1 shows a track based screening plant according to prior art.

In the following description, like numbers denote like elements. It should be appreciated that the illustrated drawings are not entirely in scale, and that the drawings mainly serve the purpose of illustrating embodiments of the invention.

A processing plant according to the invention in different function states such as transport, working and service states is shown in the following referring to FIGS. 2 to 5.

A processing apparatus shown in the figures comprises a feeder 11 in order to feed the material for processing and a processing apparatus 10 for processing such as screening or crushing the material to be fed. The processing apparatus in this example is a deck screen but the processing apparatus may also be a crusher such as a jaw, gyratory, roller or cone crusher, a horizontal shaft or vertical shaft impactor or a shredder used in metal material recycling. Further the deck screen may be a single or multi-deck screen or the screen may be for example a drum screen or a scalper or a combination of the aforesaid.

In this connection the processing plant means preferably an independent moving or movable plant which comprises preferably a track base 29. Alternatively it may also be movable for example by wheels, runners or legs or stand stationary on legs or runners (a stationary plant). The processing plant comprises also a frame 12 to which is connected a feeder 11 and the processing apparatus 10. Further the processing plant may comprise one or more conveyors (not shown in the figures) at an end and/or sides of the processing plant for conveying processed material to a pile or further to a following processing plant and actuators and power sources.

The processing apparatus 10, a screen, is connected via a suspension 33 to a body 13 which in this example is one kind of an auxiliary frame between the screen 10 and the frame 12 of the processing plant. By the body of the processing apparatus may also be denoted the frame of the processing apparatus itself.

The body 13 is connected at a starting end of the screen 10 to the frame 12 of the processing plant by joining means which comprise a third support arm 14 which is pivoted at its both ends, to which is arranged a fifth pivot point 15 is connected to the body 13 of the processing apparatus, and to which is arranged a sixth pivot point 16 which is connected to the frame 12 of the processing plant for moving an end of the processing apparatus at the feeder side substantially vertically to change a screening angle.

The third support arm 14 is preferably equipped with changeable length, for example, a lockable telescopic arm which is movable by a separate actuator such as a hydraulic cylinder. Alternatively the third support arm 14 may be an actuator such as a hydraulic cylinder or equivalent which is connected between the frame 12 and the body 13. Connecting the third support arm to the frame and the body 12, 13 may be implemented by a pin joint which is enabling a movement in longitudinal direction of the processing plant. Locking of the third support arm may be implemented for example by a locking pin to be pushed through the support arm.

The body 13 is connected at the tail end of the screen 10 to the frame 12 of the processing plant by a fourth support arm 31, 32 having changeable length which is attached at its lower end 32 non-articulated to the frame 12 of the processing plant and at its upper end 31 pivoted via a pivot point 27 to the body 13 of the processing apparatus. The rigid connection of the lower end provides a sufficient horizontal support for the processing apparatus and the feeder in their working and transport positions. The fourth support arm 31, 32 can be moved vertically via a separate actuator 26 such as a hydraulic cylinder which is connected at its upper end to the upper end 31 of the fourth support arm or to the body of the processing apparatus and at its lower end to the lower end 32 of the fourth support arm or to the frame of the processing plant.

The feeder 11 is connected at its first end, which is in this case that end to which the material fed to the feeder is supplied, to the frame 12 of the processing plant by first joining means which comprise preferably a first support arm 23 which is pivoted at an upper end via a first pivot point 24 to the feeder 11 (preferably to the body structure of the feeder) and at a lower end via a second pivot point 25 to the frame 12 of the processing plant. The first support arm 23 may be implemented as a fixed arm or like as the support arm 14 of the body of the processing apparatus described above. The pivoting enables a movement of the first support arm 23 in the longitudinal direction of the processing plant.

The first end of the feeder 10 can be connected to the frame 12 of the processing plant also by other ways which enable horizontal movement of the feeder such as by the arrangement shown in FIG. 1.

The feeder 11 is connected at its second end, which is in this case that end where from the feeder is feeding the material to the processing apparatus 10, by second joining means to the body 13 of the processing apparatus. The second joining means is preferably a pivoted second support arm 17 to which are arranged a third pivot point 19 and a fourth pivot point 18 at opposite ends of the second support arm 17. The third pivot point 19 is connected to the second end of the feeder 11, preferably to a body structure of the feeder, and the fourth pivot point 18 is connected to the body 13 of the processing apparatus for moving the second end of the feeder vertically and horizontally.

Figure 8:
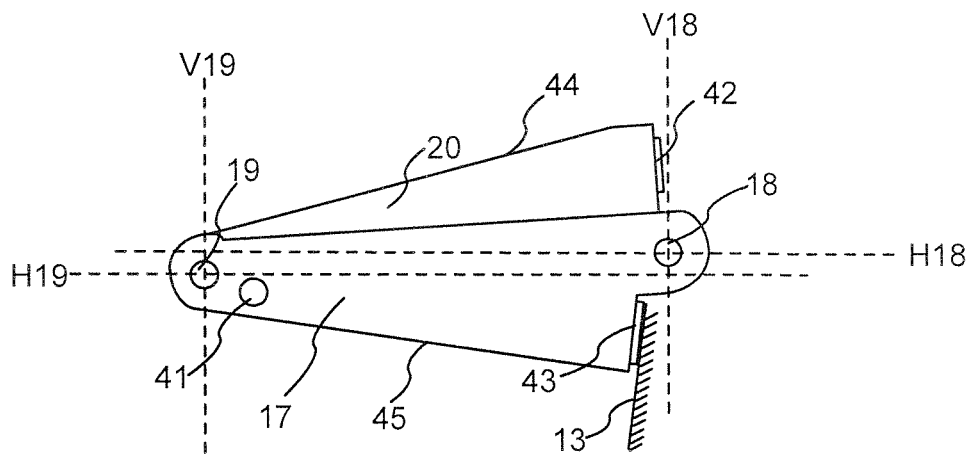
FIG. 8 shows a joining means according to an embodiment of the invention in a first position.
Figure 9:
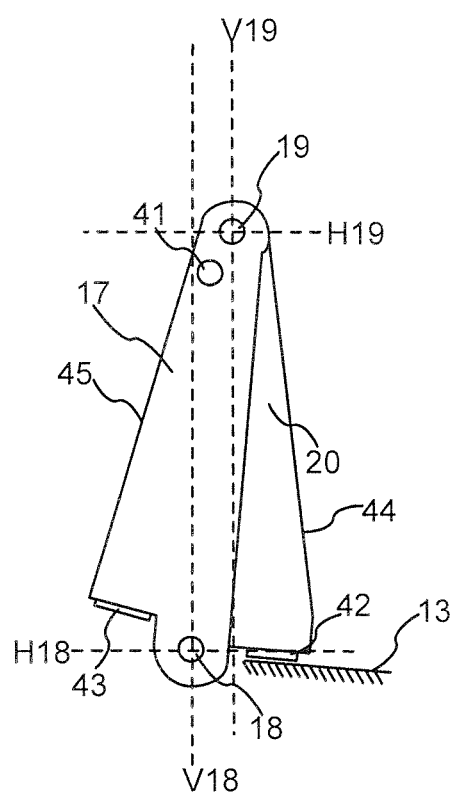
FIG. 9 shows the joining means according to an embodiment of the invention in a second position.
Figure 10:
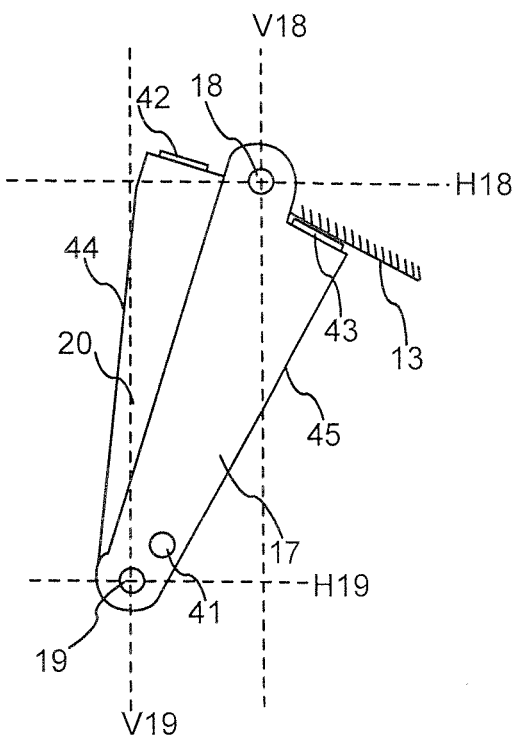
FIG. 10 shows the joining means according to an embodiment of the invention in a third position.

The second support arm 17 can be moved by a separate actuator such as a hydraulic cylinder 22 having a cylinder part which is connected to the body 13 of the processing apparatus via a pivot point 21 and a piston arm is connected to an end of the second support arm at the feeder side as a separate pivot point (reference number 41 in FIGS. 8 to 10). Alternatively the piston arm can be attached also to the third pivot point 19 of the second support arm 17 or to the same horizontal axis in relation to it. The second support arm 17 may further comprise locking means 20 which enable locking of the feeder in the working and/or transport positions which are described in more detail in connection with FIGS. 8 to 10. The pivoting of the hydraulic cylinder 22 at the processing apparatus side may be implemented for example at a middle area of the cylinder part wherein a larger working area is achieved with the hydraulic cylinder due to a longer piston arm.

Figure 6:
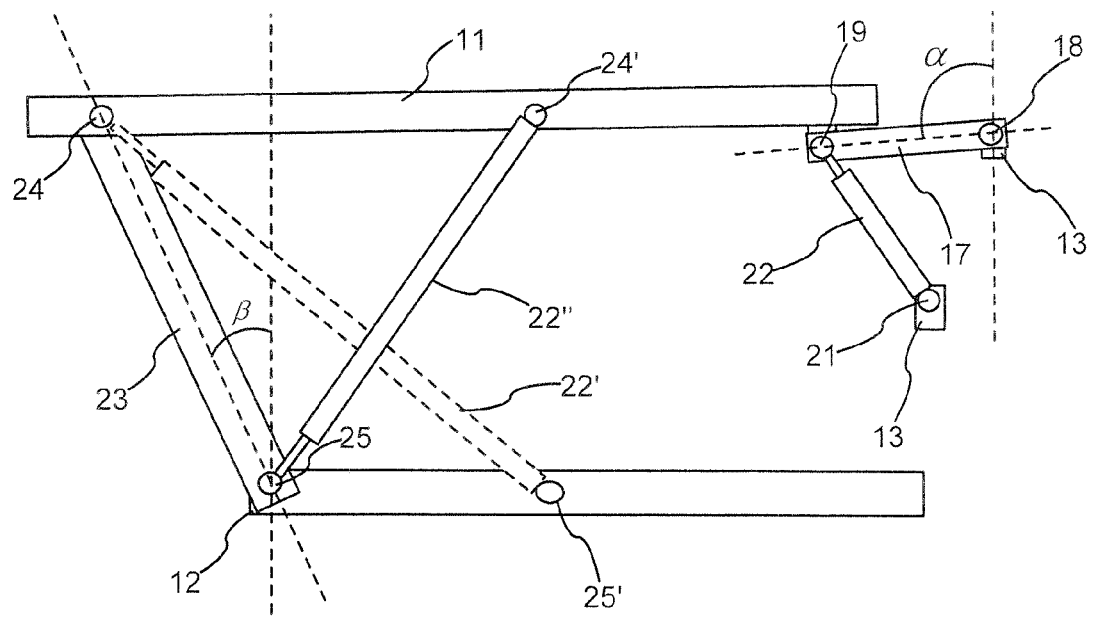
FIG. 6 shows a joining of a feeder according to an embodiment of the invention in a first position.

Alternatively or additionally to the aforementioned also the first support arm 23 may be moved by a separate actuator 22' such as a hydraulic cylinder shown in FIG. 6, a first end of which hydraulic cylinder is connected to the frame 13 of the processing plant via a separate pivot point 25' which is located at a distance from the second pivot point 25 and a second end of which hydraulic cylinder is connected as a separate pivot point to the end of the first support arm 23 at the feeder side or to the same horizontal axis in relation to the first pivot point 24 of the first support arm. Alternatively the actuator 22'' can be connected at its first end also to the second pivot point 25 of the first support arm 23 or to the same horizontal axis in relation to or at a distance from said horizontal axis and at its second end to the feeder 11, preferably to a pivot point 24' which is arranged in the body construction of the feeder at a distance from the first pivot point 24 of the first support arm 23. For example the moving force generated by the used actuator is influencing selection of the distance. Also the first support arm 23 may comprise further locking means which enable locking the feeder in the working and/or transport positions.

Figure 11:
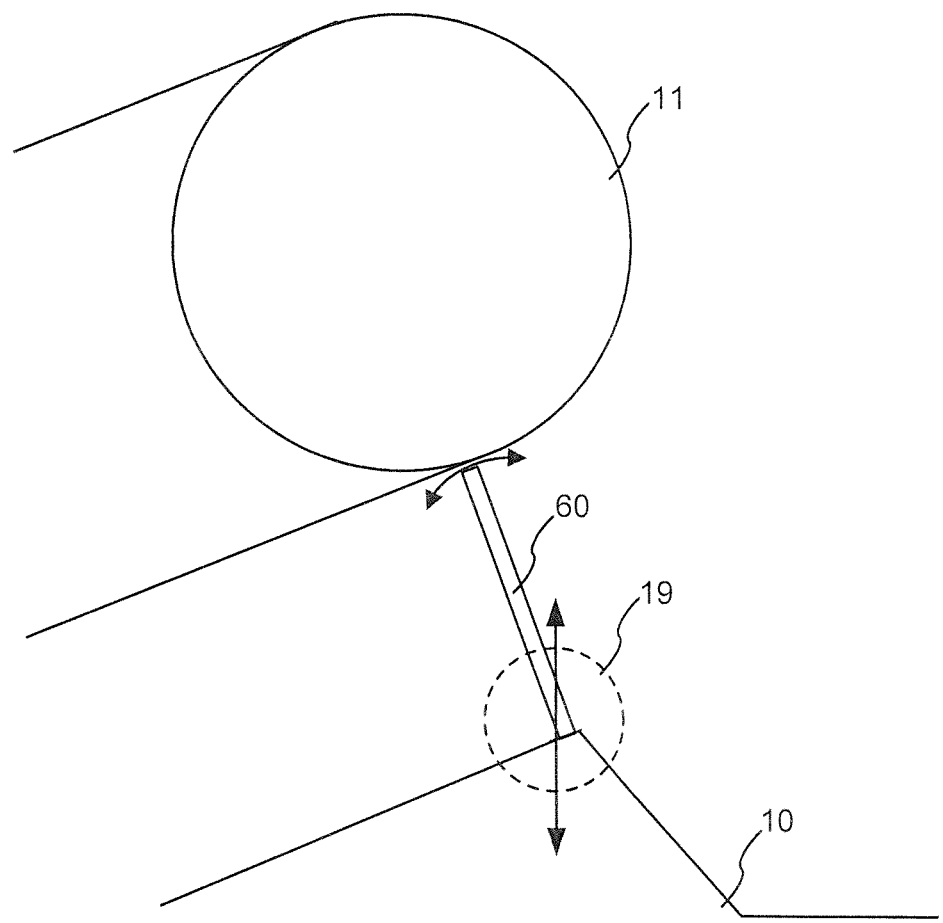
FIG. 11 shows an arrangement according to an embodiment of the invention between the feeder and a processing apparatus.

The processing plant comprises preferably also a wall 60 shown in FIG. 11, the purpose of which wall is to prevent dropping of the material to be fed under the feeder 11. The wall 60 is preferably manufactured of a wear resistant material such as rubber. The wall 60 is located preferably at the same horizontal axis with the first pivot point 19 of the support arm 17 wherein the upper portion of the wall 60 is always located at a suitable distance in relation to a lower surface of a conveyor of the feeder 11. In a most preferred case a horizontal axis of the third pivot point 19 is located as near as possible a gap between the wall 60 and the conveyor of the feeder 11 so that the gap can be dimensioned as small as possible and moving of the wall 60 freely in relation to the feeder 11 can still be enabled in different working positions.

Figure 2:
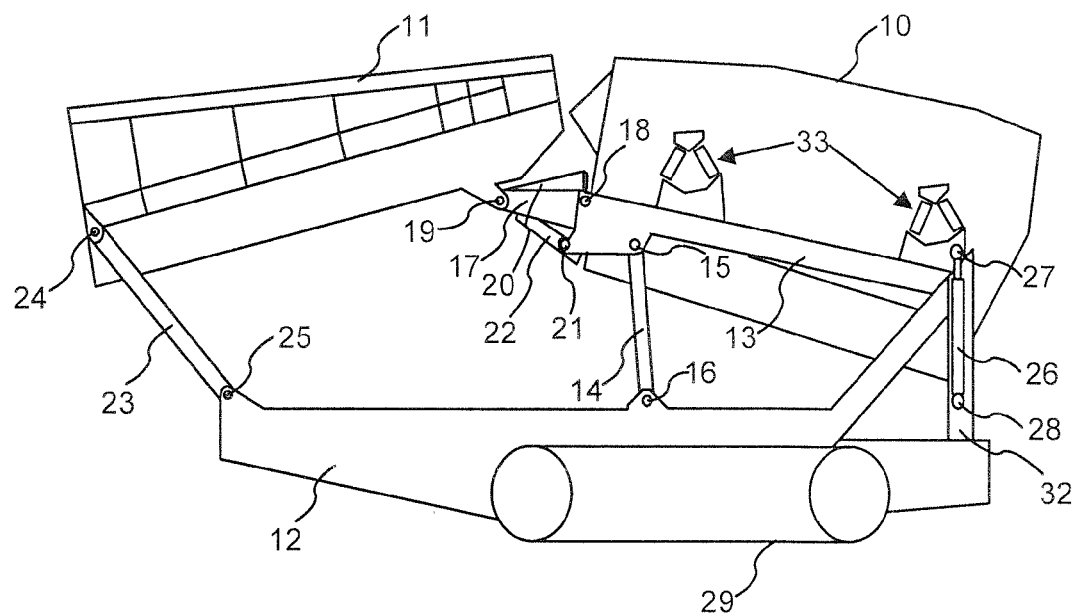
FIG. 2 shows a mineral material processing plant according to an embodiment of the invention in transport position.

FIG. 2 shows a mineral material processing plant according to an embodiment of the invention in the transport position in which the pivot points 18, 19 of the second support arm 17 are located substantially at a distance from each other in relation to the horizontal plane. The feeder 11 is in its lower position so that its height from the ground is smallest. An angle α of the second support arm 17 shown in FIG. 6 is in a preferable implementation about 90 degrees but it can also be more or less. Wider angle than 90 degrees is lowering the feeder further and at the same time the angle of the first support arm 23 is starting to decrease wherein the transport length and height can further be decreased when the starting end of the feeder can move towards the screen.

Figure 3:
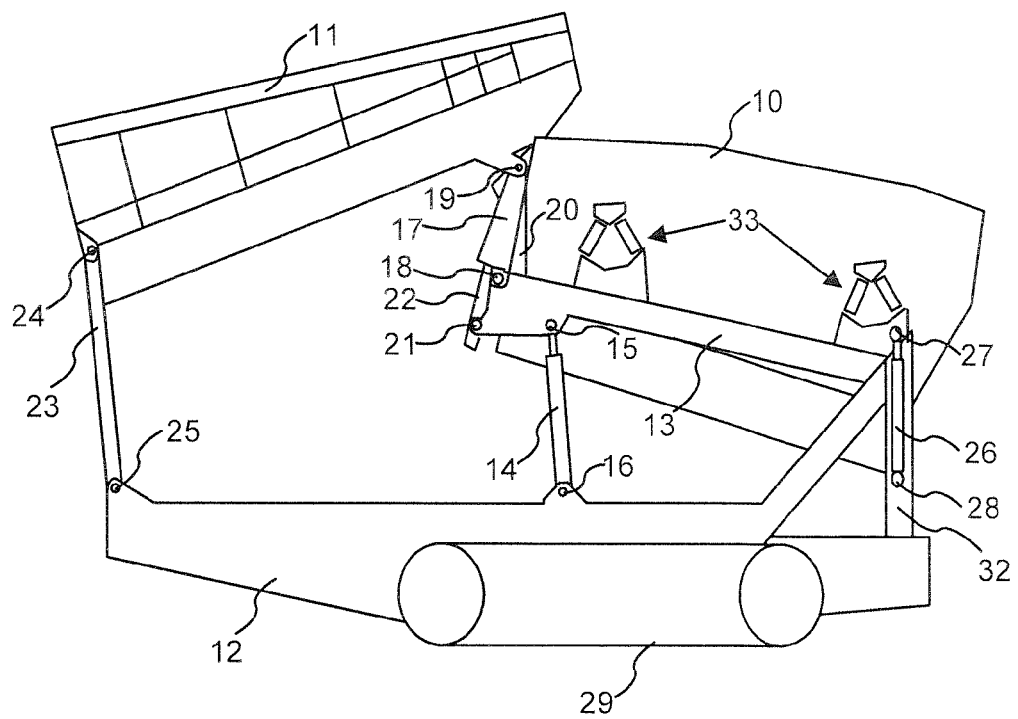
FIG. 3 shows the mineral material processing plant according to an embodiment of the invention in a first working position.

FIG. 3 shows the mineral material processing plant according to an embodiment of the invention in a first working position which is reached when the hydraulic cylinder 22 in the position shown in FIGS. 2, 6 is moving the second support arm 17 in relation to the fourth pivot point 18 wherein the second support arm is rotating clockwise and is lifting the feeder upwards and at the same time is moving the feeder 11 towards the processing apparatus 10. The angle α is decreasing, the second support arm passes a top dead centre (vertical plane perpendicular to the ground) and is settling preferably in an angle α' in relation to the vertical plane. At the same time the first support arm 23 is moving clockwise in relation to the second pivot point 25 and an angle β is decreasing and is settling preferably in an angle β' which is substantially smaller than the angle β. A locking means 20 which function is described in more detail in FIG. 9 is in contact with the body 13 of the processing apparatus wherein the second support arm an its lower fourth pivot point 18 are substantially stationary in relation to the body 13. After that the screen can be lifted and lowered at one or both ends as is described in the following wherein the feeder is always located substantially in the same place in relation to the screen so that it need not be moved in relation to the screen between the different working positions.

Figure 7:
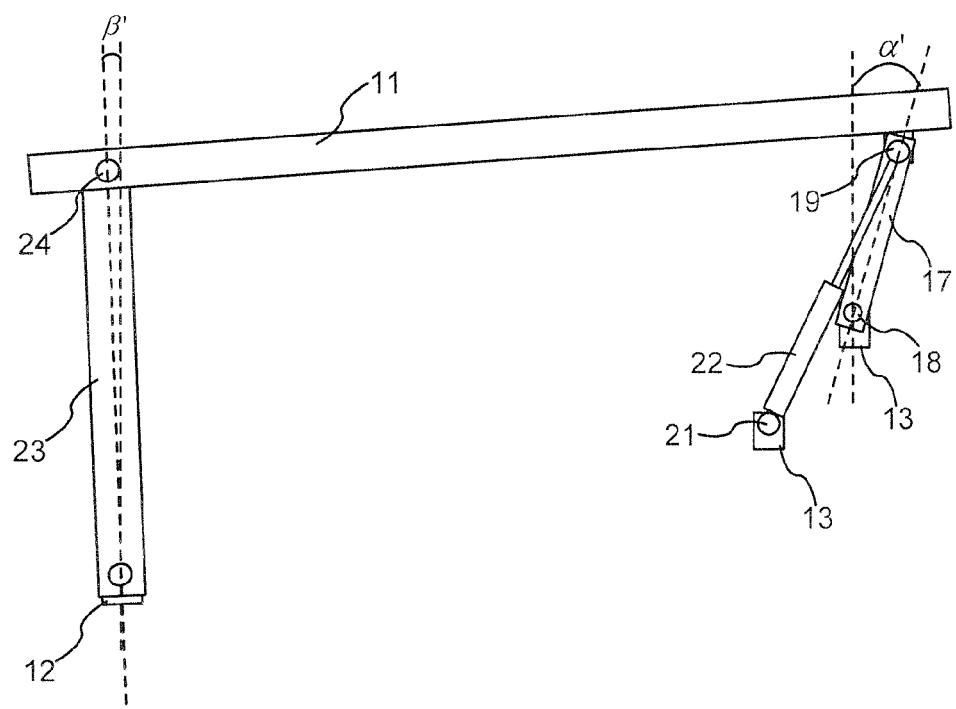
FIG. 7 shows the joining of the feeder according to an embodiment of the invention in a second position.

The third support arm 14 is lifted with a distance upwards in FIG. 3 wherein the angle of the screen is increasing in relation to the horizontal plane. The end at the screen side of the feeder 11 is moving with the body 13 and the second end is moving substantially in relation to the horizontal plane when the first support arm 23 is moving clockwise in relation to the second pivot point 25 wherein the angle β' shown in FIG. 7 is decreasing and is passing by the top dead centre finally.

Figure 4:
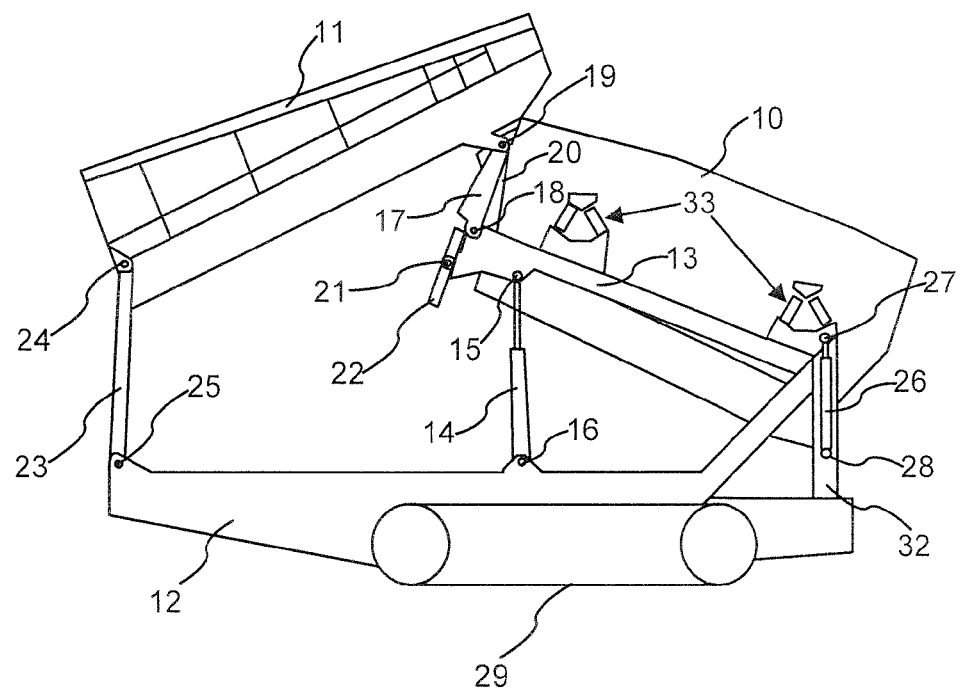
FIG. 4 shows the mineral material processing plant according to an embodiment of the invention in a second working position.

FIG. 4 shows the mineral material processing plant according to an embodiment of the invention in a second working position which is enabling a larger screening angle for the screen 10. The body 13 is moving clockwise relative to the pivot point 27 when the third support arm 14 is lifted upwards. The front end of the feeder 10 is raising upwards with the body 13 wherein the rear end of the feeder is moving towards the screen and the first support arm 13 is moving clockwise relative to the second pivot point 25 wherein finally the first support arm 23 is with the angle β' inclined relative to the horizontal plane towards the screen.

Figure 5:
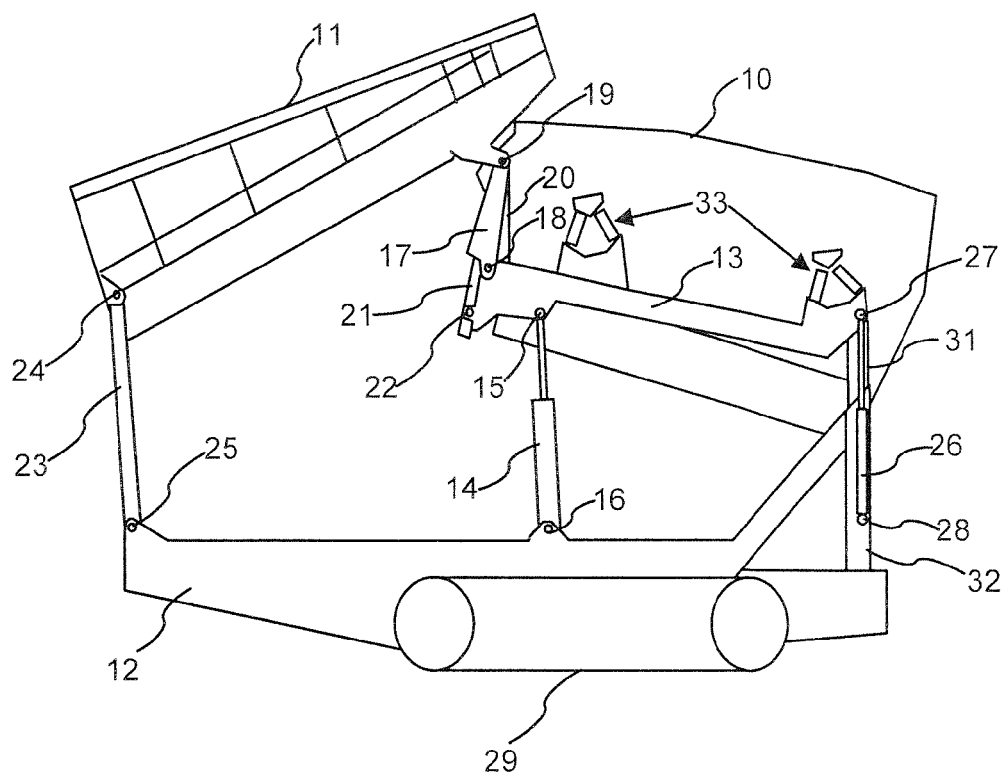
FIG. 5 shows the mineral material processing plant according to an embodiment of the invention in a third working position.

FIG. 5 shows the mineral material processing plant according to an embodiment of the invention in a third working position which is preferably the service position of the screen 10. The third support arm 14 is raised in its upper position and the second support arm 31, 32 will be raised to its upper position wherein the body 13 is moving counterclockwise relative to the pivot point 27 such as relative to the fifth pivot point 15 wherein the feeder 11 is moving clockwise relative to the third pivot point 19 and the first support arm 23 is moving counterclockwise relative to the frame of the processing plant. When the screen is raised at its both ends to the upper position, desired service, adjusting or repair operations such as for example removal of blockages or change of the lowermost screen deck may be done.

The first support arm 23 is in the working positions always substantially parallel with the vertical plane which is upright upwards. The angle β' is preferably ±10° from the vertical plane and most preferred upright upwards. The position of the first support arm 23 which is as vertical as possible is providing the best vertical support for the first end of the feeder 11.

A second joining means according to the invention is shown in more detail in FIGS. 8 to 10, which second joining means comprises the second support arm 17, the third pivot point 19 and the fourth pivot point 19 which are located at a distance from each other, preferably in the opposite ends of the second support arm. Further the second support arm 17 may comprise a separate pivot point 41 for joining to the moving means but alternatively also the third pivot point 19 is suitable for this purpose. The side profile of the second support arm 17 viewed from direction of the third pivot point 19 towards the fourth pivot point 18 preferably broadening. The second support arm 17 comprises a first side profile 45 which is one piece with the support arm. Further the second support arm comprises a second side profile 44 which is attached to the support arm as a separate piece 20. Further the second support arm 17 comprises a first support surface 43 and a second support surface 42 via which the support arm is brought substantially stationary relative to the body 13 of the processing apparatus is the transport and working positions.

FIG. 8 shows a second joining means according to an embodiment of the invention in a first position which is preferably the transport position of the feeder. In this position the pivot points 18, 19 are located relative to each other substantially in the direction of the horizontal plane. In other words, by the aforementioned is meant such a position in which the distance between a line H18 which is directed along the horizontal plane and going via the fourth pivot point 18 and a line H19 which is directed along the horizontal plane and going via the third pivot point 19, is smaller than the distance between a line V18 which is directed along the vertical plane and going via the fourth pivot point 18 and a line V19 which is directed along the vertical plane and going via the third pivot point 19.

The fourth pivot point 18 and the first support surface 43 are in contact with the body of the processing apparatus for example when a pulling force of the hydraulic cylinder and/or the gravitation force of the feeder are influencing the first pivot point wherein the feeder is arranged stationary relative the body 18 of the processing apparatus and the frame 12 of the processing plant.

The third pivot point 19 is moving relative to the fourth pivot point 18 along a circular symmetric trajectory which is optimal when it is desired to move the feeder 11 relative to the processing apparatus both in horizontal and vertical direction.

FIG. 9 shows the second joining means according to an embodiment of the invention in a second position which is preferably the working position of the feeder. In this position the third pivot point 19 and the fourth pivot point 18 are located relative to each other substantially in the direction of the horizontal plane. In other words, by the aforementioned is meant such a position in which a distance between the line V18 which is directed along the vertical plane and going via the fourth pivot point 18 and the line V19 which is directed along the vertical plane and going via the third pivot point 19, is smaller than the distance between the line H18 which is directed along the horizontal plane and going via the fourth pivot point 18 and the line H19 which is directed along the horizontal plane and going via the third pivot point 19.

The fourth pivot point 18 and the second support surface 42 are in contact with the body 13 of the processing apparatus for example when a pulling force of the hydraulic cylinder and/or the gravitation force of the feeder are influencing the third pivot point. In a preferable embodiment the second support surface 42 and the body 13 of the processing apparatus are forming an inclined surface relative to the horizontal plane wherein the weight of the feeder 11 together with the second support arm, which is inclined in the direction of travel of the material to be processed, is pressing the support surface 42 against the body 13 of the processing apparatus. Then the second support arm 17 is made stationary wherein no separate locking pins or wedges are required for the locking of the feeder. In connection with the hydraulic cylinder a locking valve may be used which is enabling holding of the cylinder free of pressure during operation but which however is preventing movement of the cylinder arm wherein the feeder will remain safely in its working position and it need not separately be moved when changing the angle of the screen, but the feeder 11 is adapting to the movement of the screen 12 via the third pivot point 19 and the first support arm 23 and the pivot points 24 and 25.

FIG. 10 shows the second joining means according to an embodiment of the invention in a third position which is an alternative transport position. In the third position the third pivot point 19 is located below the fourth pivot point 18 when viewed relative to the horizontal plane. In other words, by the aforementioned is meant such a position in which a distance between the line V18 which is directed along the vertical plane and going via the fourth pivot point 18 and the line V19 which is directed along the vertical plane and going via the third pivot point 19, is smaller than the distance between the line H18 which is directed along the horizontal plane and going via the fourth pivot point 18 and the line H19 which is directed along the horizontal plane and going via the third pivot point 19. In that way the feeder 11 can be lowered further downwards and at the same time moved in horizontal plane towards the screen wherein the total length and width of the processing plant can further be reduced.

The support surfaces 42 and 43 shown in FIGS. 8 to 10 can alternatively be implemented for example so that the first side or the side profile 45 of the second support arm 17 may act as a support surface replacing the support surface 43 or an additional support surface for that.

Alternatively the locking means of the feeder 11 can be arranged relative to the body of the feeder wherein for example the side profile 44 would be in contact with the body of the feeder in the transport position and correspondingly the side profile could be arranged in contact with the body of the feeder in the working position. Then the third pivot point 19 would be substantially stationary and the fourth pivot point 18 would enable the movement between the screen 10 and the feeder 11 between different working positions.

Although this position is the transport position in the preferable embodiment of the invention, by it may also be formed, together with a separate support arm which is pivoted at its centre portion, putting of the feeder in the working position.

The foregoing description provides non-limiting examples of some embodiments of the invention. It is clear to a person skilled in the art that the invention is not restricted to details presented, but that the invention can be implemented in other equivalent means. Some of the features of the above-disclosed embodiments may be used to advantage without the use of other features.

For example, there may be several support arms 14, 23, 17, 31, 32 and pivot points 15, 16, 18, 19, 24, 25, 27, 28 associated with them and actuators 14, 22, 26 side by side, for example, at both sides of the processing plant or additionally in between both sides.

The pivoted support arm 14, 23, 17, 31, 32 is preferably equipped with a fixed arm but it may also be equipped with a changeable length or it may also be an actuator such as a hydraulic cylinder or equivalent.

The feeder 11 may comprise one or more of the following; a lamella conveyor, a belt conveyor, a vibration feeder, a scalping feeder.

The processing apparatus 10 according to the invention may be a screen or a crusher and the processing plant according to the invention may be a screening plant or a crushing plant or a combination of both which may be a stationary plant, a track based plant, a wheel based plant, a plant movable or supported by runners or legs. The material processing plant may also comprise a processing apparatus which is suitable for metal material recycling such as a shredder.

As the actuator 14, 22, 26 may also be used, additionally to the hydraulic cylinder, an electric cylinder or another pneumatic actuator. Also a hydraulic or an electric motor may be used direct driven or via a transmission to move the support arms 14, 23, 17, 31, 32.

As such, the foregoing description shall be considered as merely illustrative of the principles of the invention, and not in limitation thereof. Hence, the scope of the invention is only restricted by the appended claims.

The invention claimed is:

1. A material processing plant comprising:
   a frame;
   a material processing apparatus having a body pivotally connected to the frame;
   a feeder operable to feed material to the material processing apparatus;
   a first joining means comprising a first support arm having a first pivot point and a second pivot point positioned a first distance from each other, wherein the first pivot point is connected to a first end of the feeder and the second pivot point is connected to the frame of the material processing plant for moving the first end of the feeder;
   a second joining means comprising a second support arm having a third pivot point and a fourth pivot point at a second distance from each other, wherein the third pivot point is connected to a second end of the feeder and the fourth pivot point is connected to the body of the material processing apparatus for moving the second end of the feeder; and
   an actuator for moving the feeder between a first position and a second position.

2. The processing plant of claim 1, wherein the second joining means are arranged to be moved in relation to the feeder and the processing apparatus between the first and the second positions, in which first position the fourth and the third pivot points are located in relation to each other substantially relative in direction of the horizontal plane and in the second position the fourth and the third pivot points are located in relation to each other substantially relative in direction of the vertical plane.

3. The processing plant of claim 1, wherein the second joining means are arranged to move in relation to the feeder and the processing apparatus between the first and the second positions, in which first position the third pivot point is located below the fourth pivot point viewed in relation to the horizontal plane and in the second position the third pivot point is located above the fourth pivot point viewed in relation to the horizontal plane.

4. The processing plant of claim 2, wherein the actuator is pivotably connected to the body of the processing apparatus and pivotably connected to an end of the second support arm at the feeder side for moving the second support arm between the said first and second positions.

5. The processing plant of claim 2, wherein the actuator is pivotably connected to the feeder and pivotably connected to an end of the first support arm at the processing apparatus side for moving the first support arm between the said first and second positions.

6. The processing plant of claim 2, wherein the said first position is the transport position of the processing plant and the second position is the working position of the processing plant.

7. The processing plant of claim 2, wherein the actuator is one of the following: an electric cylinder, a hydraulic cylinder, a pneumatic cylinder.

8. The processing plant of claim 2, wherein the processing plant further comprises locking means for locking the first or the second support arms substantially stationary in the said first and second positions.

9. The processing plant of claim 1, wherein the processing plant further comprises third joining means which comprise a third support arm having a fifth pivot point which is connected to the body of the processing apparatus and a sixth pivot point which is connected to the body of the processing plant for moving a second end of the processing apparatus.

10. The processing plant of claim 9, wherein the third joining means are arranged to be moved in relation to the frame of the processing plant and the body of the processing apparatus between fourth and fifth positions, in which fourth position the vertical distance of the frame and the body is smaller than in the fifth position.

* * * * *